United States Patent
Erlich

(10) Patent No.: US 8,218,669 B2
(45) Date of Patent: Jul. 10, 2012

(54) SPECTRALLY FLAT DELAY DIVERSITY TRANSMISSION

(75) Inventor: Yossi Erlich, Hod HaSharon (IL)

(73) Assignee: Intel Corporation, Santa Clara, CA (US)

( * ) Notice: Subject to any disclaimer, the term of this patent is extended or adjusted under 35 U.S.C. 154(b) by 313 days.

(21) Appl. No.: 12/586,008

(22) Filed: Sep. 16, 2009

(65) Prior Publication Data

US 2011/0064157 A1 Mar. 17, 2011

(51) Int. Cl.
*H04L 1/02* (2006.01)

(52) U.S. Cl. ........................................................ 375/267

(58) Field of Classification Search ................... 375/267, 375/260, 295, 299, 285; 455/69, 90.2, 101
See application file for complete search history.

(56) References Cited

U.S. PATENT DOCUMENTS

| | | | |
|---|---|---|---|
| 2006/0160495 A1* | 7/2006 | Strong | 455/101 |
| 2008/0181327 A1 | 7/2008 | Lee et al. | |
| 2009/0300454 A1* | 12/2009 | Miyoshi et al. | 714/748 |
| 2010/0074318 A1* | 3/2010 | Kawauchi et al. | 375/232 |

FOREIGN PATENT DOCUMENTS

| | | |
|---|---|---|
| WO | 2005/122516 A1 | 12/2005 |
| WO | 2008/050995 A2 | 5/2008 |
| WO | 2011/034663 A1 | 3/2011 |

OTHER PUBLICATIONS

International Search Report and Written Opinion, PCT/US2010/044120, mailed Jan. 3, 2011, 9 pages.

* cited by examiner

*Primary Examiner* — Khai Tran
(74) *Attorney, Agent, or Firm* — Thorpe North & Western LLP

(57) ABSTRACT

Delay diversity is implemented within a wireless system in a manner that can achieve a relatively flat spectrum in a receiving device. In at least one embodiment, phase shift values from an orthogonal P×N matrix A are used to provide phase shifts to a data packet to be transmitted from N transmit antennas, in a single spatial stream, to a remote wireless device. The matrix A is an orthogonal matrix with $A \cdot A^T = P \cdot I$ and $P \geq N$. Delay diversity values are also provided to the data packet before transmission.

17 Claims, 2 Drawing Sheets

SPECTRALLY FLAT DELAY DIVERSITY TRANSMISSION

TECHNICAL FIELD

The invention relates generally to wireless communication and, more particularly, to techniques for implementing delay diversity in a manner having reduced spectral ripple.

BACKGROUND OF THE INVENTION

Many new wireless communication devices and systems include multiple antennas for use in communicating with other wireless devices. In a common implementation, one of these multiple-antenna wireless devices may be called upon to communicate with another wireless device using a communication technique known as multiple input/multiple output (MIMO). In a MIMO communication channel, both a transmitting device at one end of the channel and a receiving device at the other end of the channel utilize multiple antennas. In this manner, multiple separate "spatial channels" may be formed to allow communication via multiple "spatial streams." It is often desirable, however, that these multiple-antenna devices also be compatible with older, single-antenna "legacy" devices that can only support communication using a single spatial stream.

To communicate with a single-antenna device using a single spatial stream, a multiple-antenna device can simply limit its operation to one of its available antennas. This technique, however, limits the transmit power of the multiple-antenna device to the output power capability of the power amplifier associated with the selected antenna. To reduce product size and cost, the current trend in wireless devices is to use highly integrated electronics. This strategy will often include integration of the power amplifiers of the wireless device within an integrated circuit (e.g., a radio frequency integrated circuit (RFIC), a system on a chip (SoC), etc.). The use of integrated circuit technology to implement the transmit power amplifiers will further limit the amount of transmit power that is available from a single antenna for supporting single spatial stream operation. To overcome this deficiency, techniques may be developed for utilizing multiple transmit antennas to support single stream transmission in a multiple-antenna device. When using multiple transmit antennas, the overall transmission power of a device is the combination of the transmit powers of the individual antennas (and their associated power amplifiers). Thus, a higher level of overall transmit power can be obtained. There is a need for techniques for implementing multiple-antenna, single stream wireless communication in an efficient manner.

DETAILED DESCRIPTION

Figure 1:
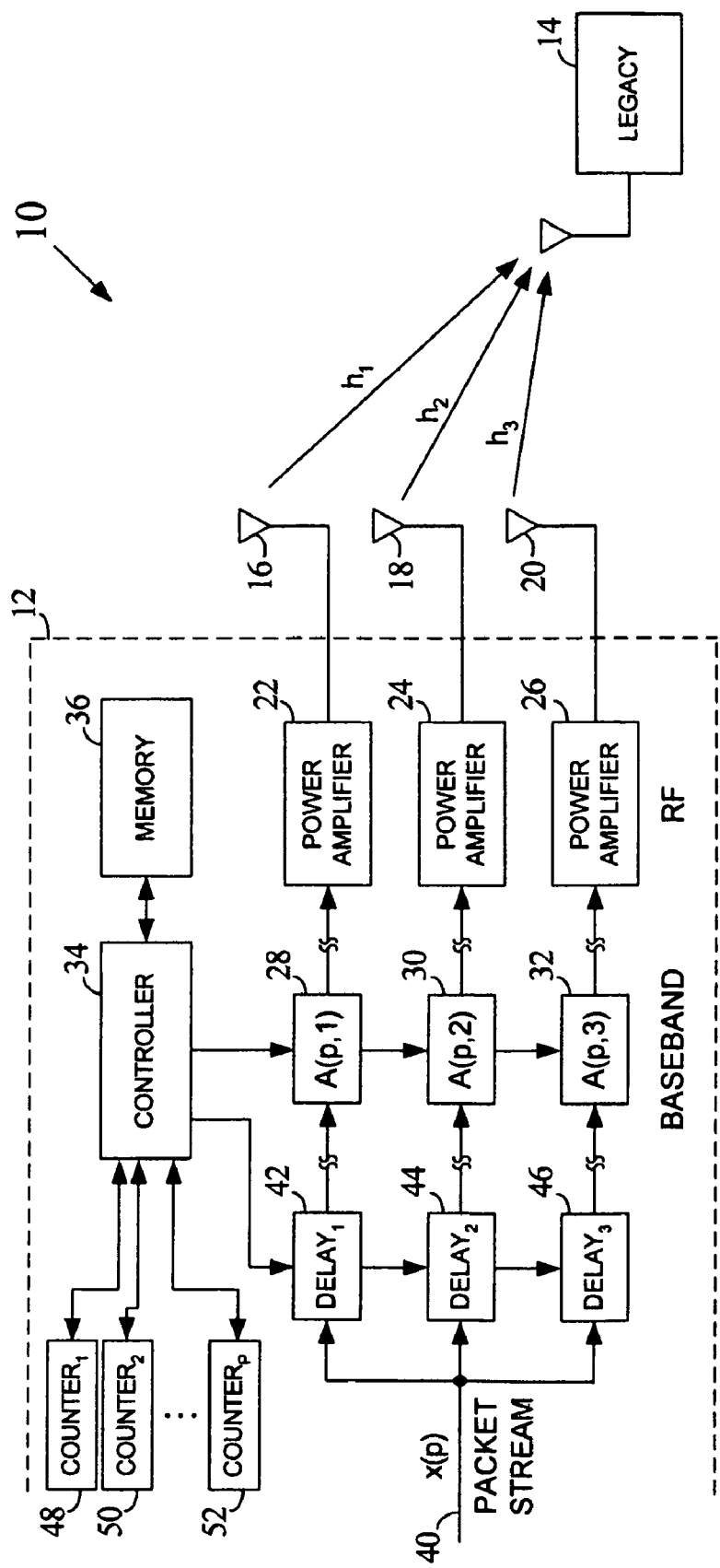
FIG. 1 is a block diagram illustrating a wireless network arrangement in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

When multiple antennas are used to transmit a single spatial stream of data to a remote wireless entity having a single receive antenna, there may be occasions where the signal is deeply flat faded at the receiving antenna. This may occur, for example, when there is line-of-sight between the transmitting antennas and the receiving antenna. To overcome this problem, a delay diversity mechanism may be implemented. Using delay diversity, the same data is transmitted from different transmit antennas using a different delay for each antenna. The IEEE 802.11n wireless networking standard, for example, defines a form of delay diversity for use with the orthogonal frequency division multiplexing (OFDM) modes that is performed cyclically within each OFDM symbol, called cyclic delay diversity (CDD). The use of delay diversity will typically result in there being no spatial location where an entire transmitted signal is flat faded.

A problem with using delay diversity is that the receiving antenna will often have ripple within its frequency spectrum. The average received power will be higher using delay diversity than it would be for the single transmit antenna case, but there will be some frequencies where the signal is deeply faded and other frequencies where the signal will be up to 20 $\log_{10}(N)$ greater than for single antenna transmission, where N is the number of transmit antennas. This ripple in the received signal may make it more difficult to satisfy one or more signal limitations specified by regulatory bodies in various countries. One such limitation is the Effective Isotropic Radiated Power (EIRP) power spectrum density limitation. For example, in Japan and in Europe, EIRP power spectrum limitations exist in some parts of the spectrum that are used for wireless local area network (WLAN). Because of this EIRP limitation, a modem may be required to "backoff" on the transmit power when delay diversity is being used. When delay diversity is implemented in a system using the complementary code keying (CCK) modulation scheme of IEEE 802.11b (which has an effective bandwidth of approximately 10 MHz) and N=2 transmit antennas, for example, the power back-off leads to a total transmitted power of:

$$10 \text{ dBm/MHz} - 10 \cdot \log_{10}(N) + 10 \cdot \log_{10}(10 \text{ MHz}) = 17 \text{ dBm EIRP}$$

which is lower than the allowed total EIRP. As will be appreciated, this backoff of transmit power reduces the efficiency with which delay diversity is implemented.

The present invention relates to techniques that are capable of significantly reducing ripple in the frequency domain of received signals when delay diversity is used in a wireless system. When a line-of-sight link exists between a transmitting station and a receiving station, some embodiments of the invention are capable of achieving a flat spectrum for the received signal (on an average basis). When an EIRP power spectrum density limitation exists, embodiments of the invention may be used to achieve a maximum level of total transmit power from a set of N antennas. In some embodiments, inventive features are implemented within systems using orthogonal frequency division multiplexing (OFDM) or other modulations that involve cyclic prefix (such a single carrier block transmission). The description that follows, however, will be made in the context of a modulation scheme that does not use cyclic prefix block transmission. For a cyclic-prefix based modulation, therefore, one utilization of the invention involves a cyclic delay rather than delay for improving the receiver performance.

FIG. 1 is a block diagram illustrating a wireless network arrangement 10 in accordance with an embodiment of the present invention. As illustrated, the arrangement 10 includes a multiple-antenna transmitting device 12 communicating with a single-antenna receiving device 14 through a wireless channel (although multiple-antenna receiving devices may also be used). In the illustrated embodiment, the multiple-antenna wireless device 12 has three transmit antennas 16, 18, 20, although in other embodiments any number greater than 1 may be used. Any type of antennas may be used including, for example, dipoles, patches, helical antennas, and/or others. Each of the transmit antennas 16, 18, 20 has a power amplifier 22, 24, 26 within an associated transmit chain to amplify communication signals for transmission. The transmit chains of the transmit antennas 16, 18, 20 also include corresponding phase shifters 28, 30, 32 for use in flattening the signal spectrum at a remote receiving device and corresponding delay devices 42, 44, 46 to implement delay diversity. A controller 34 may be provided to control the phase shift values of the phase shifters 28, 30, 32 and/or the delay values of the delay devices 42, 44, 46 during communication activity. A memory 36 may be used to store phase shift information and/or delay information for access by the controller 34. As will be described in greater detail, in some embodiments, a number of counters 48, 50, 52 are provided for use in situations where packets of unequal (i.e., arbitrary) duration are being transmitted.

Although illustrated as separate units, in some embodiments, the power amplifiers 22, 24, 26 may all be integrated on a common semiconductor chip (e.g., an RFIC, an SoC, etc.). Similarly, the phase shifters 28, 30, 32 and the delay devices 42, 44, 46 may all be integrated on a common chip (and, in some embodiments may be implemented on a common chip with the power amplifiers 22, 24, 26). In other embodiments, the phase shifters 28, 30, 32 and the delay devices 42, 44, 46 may be implemented digitally within a common processor as the controller 34. Other architectures may alternatively be used. Although not shown, it should be appreciated that other functionality may exist between the phase shifters 28, 30, 32 and the power amplifiers 22, 24, 26 and/or between the between the phase shifters 28, 30, 32 and the delay devices 42, 44, 46. For example, in at least one embodiment, a digital-to-analog converter and a frequency conversion unit (e.g., an up-converter) may be provided between each phase shifter 28, 30, 32 and a corresponding power amplifier 22, 24, 26. Also, in some embodiments, the positions of the phase shifters 28, 30, 32 and the delay devices 42, 44, 46 may be reversed (i.e., the delay devices 42, 44, 46 may be between the phase shifters 28, 30, 32 and the power amplifiers 22, 24, 26). The controller 34 may include any type of digital control device including, for example, a general purpose microprocessor, a digital signal processor (DSP), a reduced instruction set computer (RISC), a complex instruction set computer (CISC), a field programmable gate array (FPGA), an application specific integrated circuit (ASIC), a microcontroller, and/or others, including combinations of the above. In at least one embodiment, the phase shifters 28, 30, 32 and/or the delay devices 42, 44, 46 are implemented in software within the controller 34 (although separate analog or separate digital phase shifters may alternatively be used). The memory 36 may include any type of digital data storage.

As illustrated in FIG. 1, a series of data packets x(p) to be transmitted to the remote single-antenna device 14 may arrive at a terminal 40, one packet at a time. A first packet x(1) is delivered to the delay units 42, 44, 46, which each apply a different delay value to the packet (or a different cyclic delay value for systems that are cyclic prefix based) to implement delay diversity (or cyclic delay diversity). Techniques for applying delay diversity are well known in the art. The delayed versions of the first packet are next delivered to the phase shifters 28, 30, 32 which shift the phases of the packets by corresponding phase shift values (i.e., A(1,1), A(1,2), and A(1,3)). The controller 34 may deliver the phase shift values (or control information indicative thereof) to the phase shifters 28, 30, 32 just prior to receipt of the delayed versions of the first packet. As described previously, the order of the delay units 42, 44, 46 and the phase shifters 28, 30, 32 may be switched. The phase-shifted versions of the first packet x(1) are subsequently directed to the corresponding power amplifiers 22, 24, 26 to be amplified before transmission from antennas 16, 18, and 20. The above-described process may then be repeated for each new packet in the series of data packets x(p). For each new packet, new phase shift values may be delivered to the phase shifters 28, 30, 32 by the controller 34.

For each data packet, the signals transmitted from the three antennas 16, 18, will traverse the wireless channel and be received by the sole antenna of the single-antenna legacy device 14. The legacy device 14 will then process the received signals to recover the original data. The legacy device 14 does not need to know that there is a delay diversity transmission, or any transmission from more than a single antenna.

As described above, one of the problems with the use of delay diversity relates to ripple in the frequency domain at the receiving device. In accordance with the present invention, this frequency domain ripple may be significantly reduced by intelligently selecting the phase shift values that are applied by the phase shifters 28, 30, 32. In at least one embodiment, a P×N matrix is used to represent the phase shift values for the input data packets, where N is the number of antennas to be used to transmit the data packets and P is the number of successive data packets (or time slots) over which the matrix operates. Each element of the P×N matrix consists of a complex exponent $e^{j\theta}$, where $\theta$ is the phase shift value associated with the element and $0 \leq \theta < 2\pi$. To achieve a reduction in ripple, the P×N matrix that is used is an orthogonal matrix A with $A \cdot A^T = P \cdot I$, where $A^T$ is the complex transpose of matrix A and I is the identity matrix.

Data that is representative of the orthogonal P×N matrix A may be stored within the memory 36 (see FIG. 1). The controller 34 may then access the data during communication operation. The data does not have to be stored in the form of a matrix as long as the controller 34 knows or can determine where the appropriate phase shift data is stored. The phase shift data can be stored in the memory 36 as complex exponents, as real numbers representative of desired phase shifts (e.g., 2.094395 rather than exp(j2π/3), etc.), or in any other format from which the desired phase shifts can be determined. As used herein, the word "matrix" will be used in the broad sense to encompass data that is representative of a particular matrix although not stored or arranged in the form of a matrix.

In at least one embodiment, when a single spatial stream data transmission is to be made, the multiple-antenna wireless device 12 will operate on a series of P consecutive, constant length data packets using the orthogonal matrix A. For a first data packet in the series, the controller 34 will provide phase shift values to the phase shifters 28, 30, 32 from a first row of the matrix A (i.e., A(1,1), A(1,2), and A(1,3)). For a second data packet in the series, the controller 34 will provide phase shift values to the phase shifters 28, 30, 32 from a second row of the matrix A (i.e., A(2,1), A(2,2), and A(2,3)). For each successive data packet after that, if any, the controller 34 will provide phase shift values from a corresponding row of the matrix A. The technique does not have to go sequentially through the rows of the matrix, but can skip around as long as all P rows are used for the P packets. The number of rows in the matrix A (which is also the number of packets in the series of packets) is greater than or equal to the number of antennas N that are used to transmit the packets. The number of antennas will be greater than 1, but it does not have to include all of the available antennas within a device. For example, a 4-antenna device can use three antennas to perform single spatial stream transmission using delay diversity.

As described above, the use of an orthogonal matrix of phase shift values to perform multiple-antenna, single stream transmission over a number of successive data packets permits a significant reduction in ripple in a remote receiving device. This reduction in ripple makes it easier to meet any EIRP power spectrum density limitations that may be imposed by regulating bodies. The reason for the ripple reduction will now be described. For an arbitrary frequency f, the signal received at a remote legacy device having a single antenna may be expressed as:

$$r(p) = \sum_{n=1}^{N} [a_n(p) \cdot x(p, f) \cdot e^{-j2\pi f T_n} \cdot h_n(f)]$$

where $a_n(p)$ is the matrix element for transmit antenna n and time slot p, $h_n(f)$ is the channel response at frequency f for transmit antenna n ($1 \leq n \leq N$), $T_n$ is the delay applied within transmit chain n, and $x(p,f)$ is the frequency domain value of the transmitted signal at time slot p. To have a reduced ripple, the average of the received power may be made a constant. This may be done for all frequencies in a multicarrier implementation. For a three antenna implementation, the average received power may be made constant as follows:

$$p = E\left\{ \begin{bmatrix} r(1) \\ r(2) \\ r(3) \end{bmatrix}' \begin{bmatrix} r(1) \\ r(2) \\ r(3) \end{bmatrix} \right\}$$

$$= \begin{bmatrix} E_{x(1)} e^{-j2\pi f T_1} h_1 \\ E_{x(2)} e^{-j2\pi f T_2} h_2 \\ E_{x(3)} e^{-j2\pi f T_3} h_3 \end{bmatrix}' \begin{bmatrix} a'(1) \\ a'(2) \\ a'(3) \end{bmatrix}' \begin{bmatrix} a'(1) \\ a'(2) \\ a'(3) \end{bmatrix} \begin{bmatrix} E_{x(1)} e^{-j2\pi f T_1} h_1 \\ E_{x(2)} e^{-j2\pi f T_2} h_2 \\ E_{x(3)} e^{-j2\pi f T_3} h_3 \end{bmatrix}$$

$$= \left\| \begin{bmatrix} E_{x(1)} e^{-j2\pi f T_1} h_1 \\ E_{x(2)} e^{-j2\pi f T_2} h_2 \\ E_{x(3)} e^{-j2\pi f T_3} h_3 \end{bmatrix} \right\|^2$$

$$= \left\| \begin{bmatrix} E_{x(1)} h_1 \\ E_{x(2)} h_2 \\ E_{x(3)} h_3 \end{bmatrix} \right\|^2$$

where $E\{\}$ is the expected value operator and $E_{x(i)}$ is expected value of $x(i)$. Thus, if the A matrix is orthogonal and $E_{x(i)}$ is constant, then the average received power will be constant. $E_{x(i)}$ will be constant if $x_i$ is independent and stationary.

There are many different orthogonal matrices that may be used in accordance with embodiments of the invention. For a two antenna implementation with P=2, for example, the following matrix may be used:

$$A = \begin{bmatrix} 1 & 1 \\ 1 & -1 \end{bmatrix}$$

where the 1 is equivalent to $e^{j0}$. For a three antenna implementation with P=3, the following matrix may be used:

$$A = \begin{bmatrix} 1 & 1 & 1 \\ 1 & e^{j\frac{2\pi}{3}} & e^{-j\frac{2\pi}{3}} \\ 1 & e^{-j\frac{2\pi}{3}} & e^{j\frac{2\pi}{3}} \end{bmatrix}.$$

For a three antenna implementation with P=4, the following matrix may be used:

$$A = \begin{bmatrix} 1 & 1 & 1 \\ 1 & -1 & 1 \\ 1 & 1 & -1 \\ 1 & -1 & -1 \end{bmatrix}.$$

This matrix may be desirable because it uses the more convenient +1 and −1 as elements, rather than elements such as $$e^{j\frac{2\pi}{3}}$$

in the previous example. For a four antenna implementation with P=4, the 4×4 Hadamard matrix may be used:

$$A = \begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

Other orthogonal matrices may alternatively be used.

In the discussion above, it was assumed that the transmitted data packets were of constant length. This allowed the rows of the matrix A to be used in a cyclic order, once per packet. For the more common case of variable packet length, a counter mechanism may be used to achieve a constant or approximately constant average receive power at the receiver. That is, in at least one embodiment, the multi-antenna transmitting device will hold P counters (e.g., counters 48, 50, 52 of FIG. 1) that each count the total time that past packets in one of the P modes were transmitted. The mode (i.e., the row index in the matrix A) for the next transmitted packet is selected by the index of the counter with the minimum value. To avoid counter overflow, the minimum counter value may be subtracted from all of the N packets. This technique will therefore use each line of the matrix A with equal intensity. Other similar counting techniques may alternatively be used.

For the simple case of two transmit antennas with P=2, some of the packets will use an inverted phase (−1) at the baseband signal for one of the two antennas. The transmitting device holds a single signed counter that counts the time duration of the inverted packets minus the duration of packets that were not inverted. If the counter is positive, the next packet is transmitted without inversion and the packet duration is subtracted from the counter. If the counter is negative, the next packet is transmitted with inversion and the packet duration is added to the counter.

A useful strategy for a system with N antennas that occasionally uses less than all of the N antennas (e.g., to save power, etc.) is to select a matrix A that satisfies all combinations of antennas. For example, for N=4 or N=3, the 4×4 Hadamard matrix may be used. In such a case, P=4 may be used for any selected subset of the antennas. In this manner, the desired spectral properties may be maintained.

Figure 2:
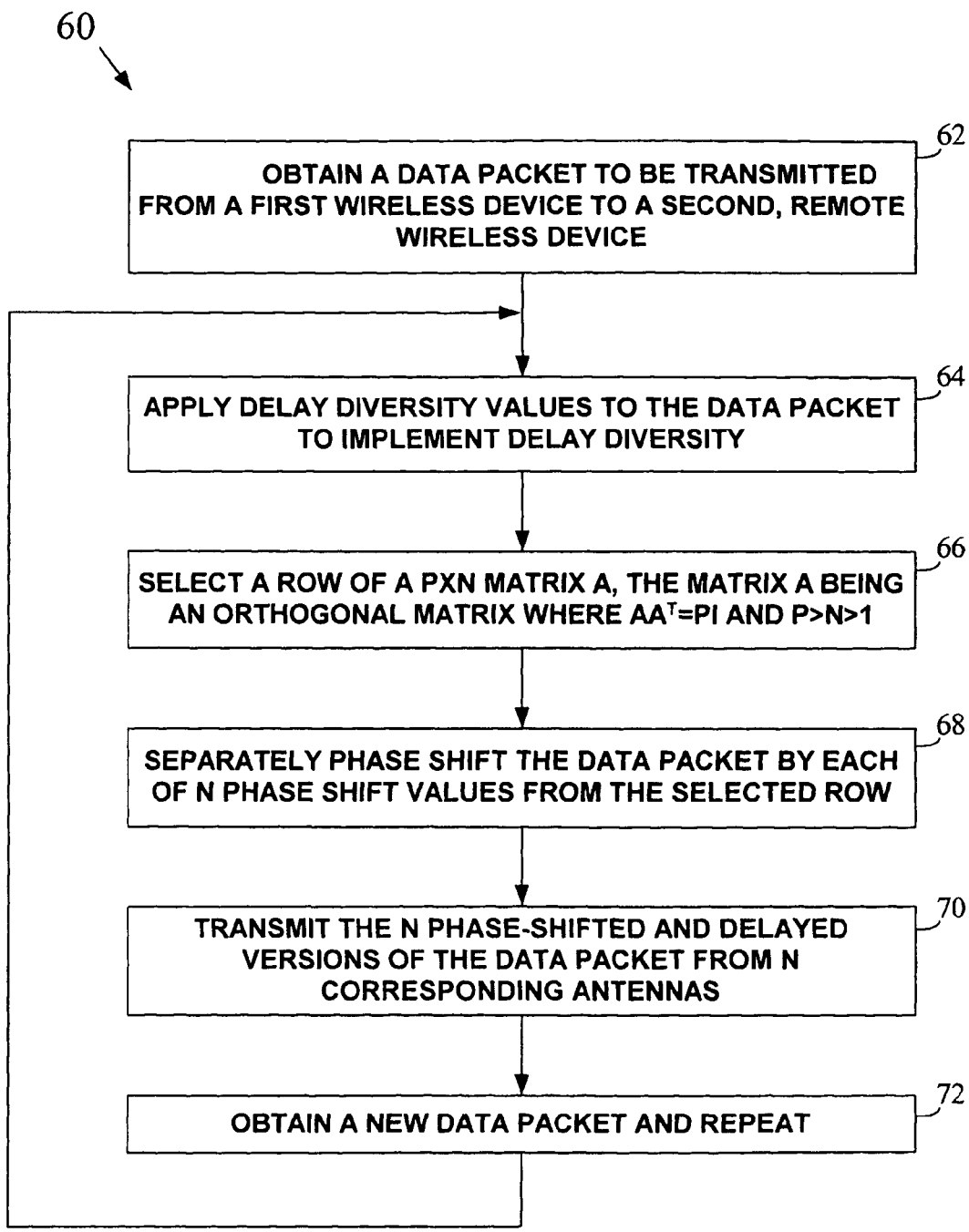
FIG. 2 is a flowchart illustrating a method of transmitting data within a single spatial stream using multiple antennas in accordance with an embodiment of the present invention.

FIG. 2 is a flowchart illustrating a method 60 for use in transmitting data from a first wireless device to a second wireless device via a single spatial stream using delay diversity in accordance with an embodiment of the present invention. A data packet is obtained that is to be transmitted from the first wireless device to the second wireless device (block 62). Multiple delay diversity values (or cyclic delay diversity values) are first applied to the data packet to implement delay diversity. That is, one delay diversity value will typically be applied to the data packet for each transmit chain in the transmitter (where N transmit chains associated with N transmit antennas are currently active) (block 64). A row of an orthogonal P×N matrix A where $AA^T=PI$ is then selected (block 66). The elements of the P×N matrix A are complex exponents $e^{jq}$, where q is a phase shift value and $0 \leq q < 2\pi$. Data representing the matrix A may be stored within a memory in a multiple-antenna transmitting device. The data packet may then be separately phase shifted by each of N phase shift values from the selected row of the P×N matrix A (one for each active transmit chain) (block 68). The phase-shifted and delayed data packet of each transmit chain may now be transmitted from a corresponding antenna of the first wireless device (block 70). A new data packet is then obtained and the process is repeated (block 72).

If uniform length data packets are being used, the above-described method 60 may operate on groups of P input packets to be transmitted to the remote wireless device. The selection element (block 66) may then simply select one row of the matrix A for each of the P packets. This may be done sequentially or randomly, as long as each of the P rows is used for one of the P packets. If non-uniform length data packets are being used, then techniques may be implemented to keep track of how much transmit time has been used for each of the rows (or modes) of the matrix A. In at least one embodiment, as described previously, counters are used to keep track of the total time that each mode is used while transmitting. One counter may be provided for each mode. Then, if a short packet is transmitted using, for example, the second row of the matrix A, the counter value associated with the second row is increased by an amount proportional to the length of the short packet. Similarly, if a long packet is transmitted using the fifth row of the matrix A, the counter value associated with the fifth row is increased by an amount proportional to the length of the long packet. The row selection (e.g., block 66 in FIG. 2) may then be performed by selecting the row associated with the counter having the lowest count value. Each time a packet is transmitted, the corresponding counter of that is updated.

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; cameras having wireless capability; audio/video devices having wireless capability; network interface cards (NICs) and other network interface structures; base station equipment; wireless access points; integrated circuits; and/or within other devices. Features of the invention may also or alternatively be embodied as instructions and/or data structures stored on machine readable media. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A computer implemented method comprising:
   obtaining a data packet to be transmitted to a remote wireless device;
   for each of N transmit chains, applying a predetermined delay value to said data packet to implement delay diversity, where N is an integer greater than 1;
   providing an orthogonal P×N matrix A that satisfies $A \cdot A^T = P \cdot I$ where P is an integer and $P \geq N$, said matrix A including a plurality of phase shift values;
   selecting a row of said matrix A;
   for each of said N transmit chains, phase shifting said data packet by a corresponding one of said phase shift values in said selected row of said matrix A; and
   for each of said N transmit chains, transmitting a delayed and phase shifted version of said data packet from a corresponding antenna to said remote wireless device;
   wherein selecting a row includes selecting a row that achieves an approximately constant average receive power at a second wireless device over time.

2. The method of claim 1, wherein:
   applying a predetermined delay value is performed before phase shifting said data packet for each of said N transmit chains.

3. The method of claim 1, wherein:
   phase shifting said data packet is performed before applying a predetermined delay value for each of said N transmit chains.

4. The method of claim 1, wherein:
selecting a row includes choosing a row based on a cumulative amount of transmit time during which each row of said matrix A was used in the past to transmit data packets to said remote wireless device.

5. The method of claim 4, wherein:
counters are used to track the cumulative amount of transmit time during which each row of said matrix A was used in the past to transmit data packets to said remote wireless device.

6. The method of claim 1, wherein:
selecting a row includes choosing a next sequential row within said matrix A after a row that was used to transmit a most recently transmitted data packet.

7. The method of claim 1, wherein:
selecting a row includes choosing a row that has been used least recently to transmit a data packet to said remote wireless device.

8. The method of claim 1, wherein:
said matrix A is a Hadamard matrix.

9. A computer readable medium or media having computer readable instructions that, when executed by a computing platform, perform the method of claim 1.

10. A wireless apparatus comprising:
a wireless transmitter having N transmit chains, where N is an integer greater than 1, each of said N transmit chains including a delay unit to apply a delay to an input packet to implement delay diversity and a phase shifter to apply a phase shift to the input packet;
a memory to store information describing an orthogonal P×N matrix A that satisfies $A \cdot A^T = P \cdot I$ where P is an integer and $P \geq N$, said matrix A including a plurality of phase shift values; and
a controller to control the operation of said wireless transmitter, said controller being programmed to, when a data packet is to be transmitted via a single spatial stream to a remote wireless entity: (a) direct said data packet to an input of each of said N transmit chains, (b) select a row of said matrix A that includes N phase shift values, and (c) apply said phase shift values to said data packet using said phase shifters within said N transmit chains, wherein said controller selects a row of said matrix A in a manner that, over time, will achieve an approximately constant average receive power at said remote wireless entity.

11. The wireless apparatus of claim 10, further comprising:
a transmit antenna for each of said N transmit chains.

12. The wireless apparatus of claim 10, wherein:
said controller selects a row of said matrix A for said data packet based on a cumulative transmit time during which each row of said matrix A was used in the past to transmit data packets to said remote wireless entity.

13. The wireless apparatus of claim 12, further comprising:
a plurality of counters to track said cumulative transmit time for each row of said matrix A.

14. The wireless apparatus of claim 10, wherein:
said controller selects a row of said matrix A for use with said data packet by sequencing consecutively through said rows of said, matrix A for each new packet to be transmitted to said remote wireless entity.

15. The wireless apparatus of claim 10, wherein:
said controller selects a row of said matrix A for use with said data packet by choosing one row for each new packet to be transmitted, in a manner that ensures that all rows of said matrix A are selected before any row is selected for a second time.

16. The wireless apparatus of claim 10, wherein:
said matrix A is a Hadamard matrix.

17. The wireless apparatus of claim 10, wherein:
said matrix A can also be used when less than N of said N transmit chains are active.

* * * * *